Jan. 20, 1970   F. W. LAKE   3,490,548
ADJUSTABLY POSITIONED VEHICLE MOUNTED TOOL
AND TOOL SUPPORT STRUCTURE
Filed July 24, 1968   3 Sheets-Sheet 1

INVENTOR
FRANK W. LAKE

BY Baldwin, Wight, Diller & Brown
ATTORNEYS

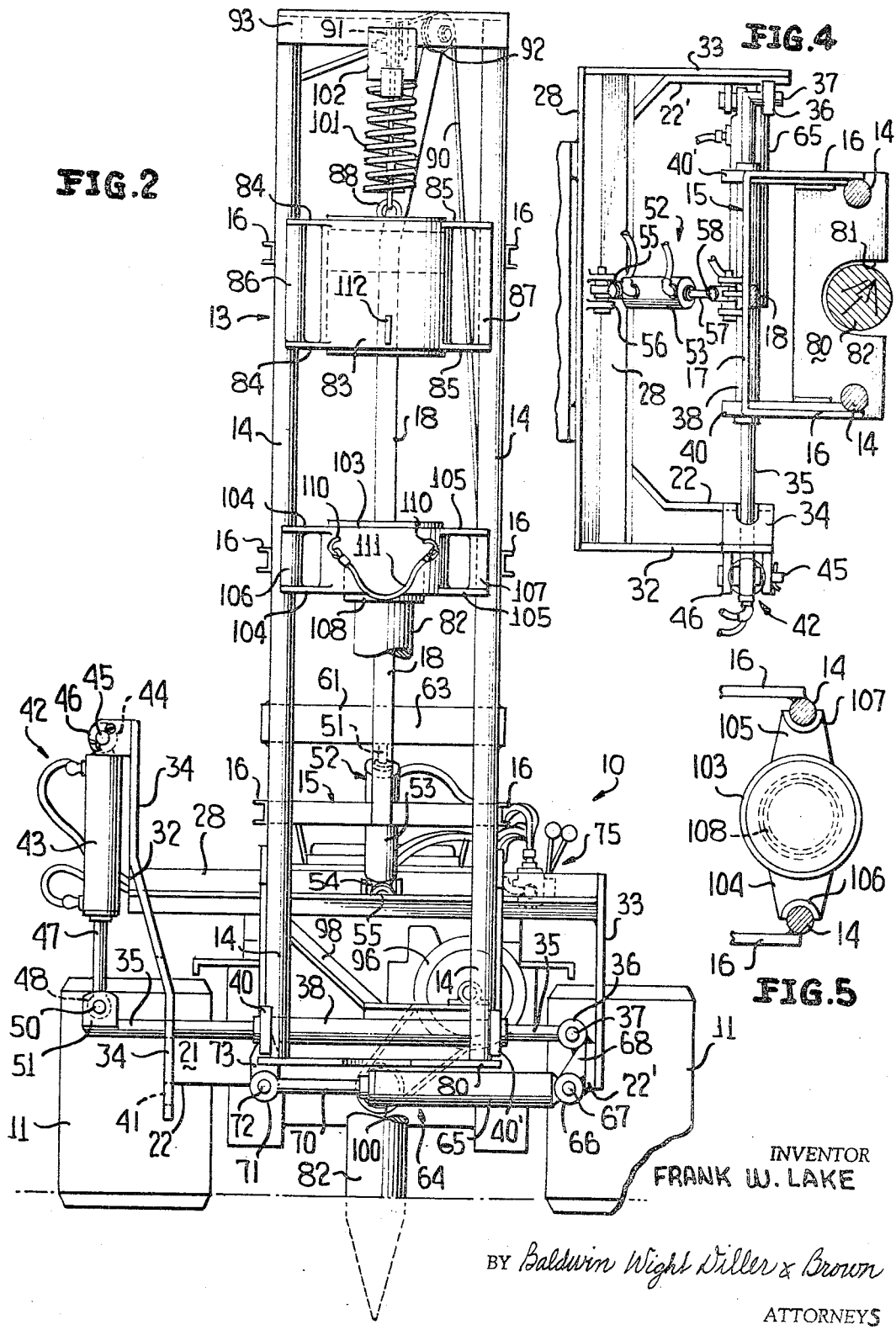

Jan. 20, 1970  F. W. LAKE  3,490,548
ADJUSTABLY POSITIONED VEHICLE MOUNTED TOOL
AND TOOL SUPPORT STRUCTURE
Filed July 24, 1968  3 Sheets-Sheet 3

INVENTOR
FRANK W. LAKE

BY Baldwin Wight Diller & Brown
ATTORNEYS

United States Patent Office 3,490,548
Patented Jan. 20, 1970

3,490,548
ADJUSTABLY POSITIONED VEHICLE MOUNTED TOOL AND TOOL SUPPORT STRUCTURE
Frank W. Lake, 229 Mill St.,
Walterboro, S.C. 29488
Filed July 24, 1968, Ser. No. 747,204
Int. Cl. E21c 5/00, 11/02
U.S. Cl. 173—43
10 Claims

ABSTRACT OF THE DISCLOSURE

A vehicle mounted pile driving tool and tool support structure including a generally vertically upstanding superstructure, support provisions mounted on the vehicle, a support bar pivotally connected with the support provisions, a slidable and rotatable sleeve supported upon the support bar and affixed to the superstructure and fluid actuated piston-cylinder assemblies for pivoting the superstructure and associated sleeve about the axis of the support bar, for sliding the superstructure and sleeve parallel to the axis of the support bar and for pivoting the support bar about its pivotal connection with the support provisions. The superstructure includes a pair of generally vertically upstanding shafts, and a slidably mounted pile driving hammer and a slidably mounted pile protective boot are maintained between the upstanding shafts and guided thereby.

---

This invention relates generally to vehicle mounted tools and tool support structures, and more particularly to tool and support structure combinations variable in position in three directions relative to an associated vehicle.

In the past, support structures for pile drivers and other vehicle mounted tools have been provided including a supporting and guiding superstructure variable in several directions with respect to the associated vehicle. However, such previously known arrangements have often been characterized by relatively complex provisions for varying the position of the tool and tool support structure relative to the supporting vehicle or have required a supporting vehicle which is especially designed or adapted for use solely with the positionally adjustable tool and tool support provisions. Accordingly, owners of tractors, tread driven vehicles, or other work vehicles have often been precluded from a desired use of vehicle supported pile drivers or other tools in light of the expense involved in providing the aforementioned relatively complex arrangements or in light of the inability to adapt available vehicles to previously known positionally adjustable tool support structures.

In view of the foregoing, then, it is a primary object of this invention to provide a tool support structure for use with available work vehicles.

Similarly, it is a further primary object of this invention to provide a relatively inexpensive tool support structure including a positionally variable and generally upstanding superstructure suitable for employment with available work vehicles.

A further object of this invention is to provide a tool structure including a generally upstanding superstructure, support provisions for attachment to a vehicle and provisions for varying in three directions the position of the superstructure relative to the associated vehicle and the support provisions.

Yet another object of this invention is to provide structure in accordance with the immediately foregoing object wherein the provisions for varying the position of the superstructure include a pivotally mounted support bar, a slide mounted upon the support bar and affixed to the superstructure and means for pivoting the superstructure and slide about the support bar, for sliding the slide and superstructure parallel to the support bar and for pivoting the support bar to provide a tilting of the superstructure.

Yet another object of this invention is to provide a tool structure in accordance with the immediately foregoing object wherein the superstructure includes pile driver hammer guide shafts in guiding association with a pile driver hammer and wherein the guide shafts are fixedly connected with a sleeve which constitutes the aforementioned slide.

A still further object of this invention is to provide a tool structure for employment with a vehicle and including a generally upstanding superstructure, a pivotally mounted support bar, a slide which slidably mounts the superstructure on the support bar and three fluid actuated piston-cylinder assemblies for pivoting the superstructure and slide about the support bar, for sliding the superstructure and slide parallel to the support bar and for pivoting the support bar to tilt the superstructure.

With the above and other objects in view that will hereinafter appear, the nature of the invention will be more clearly understood by reference to the following detailed description, the appended claims, and the several views illustrated in the accompanying drawings.

In the drawings:

FIGURE 2 is a front elevational view of the tool structure illustrated in FIGURE 1 and shows a generally upstanding superstructure supported upon a pivotal support bar and three fluid actuated piston-cylinder assemblies for varying the position of the superstructure.

FIGURE 4 is a fragmentary horizontal cross-sectional view taken along the line 4—4 of FIGURE 1 and shows the pivotal support bar, sleeve and superstructure and a first piston-cylinder assembly connected with the superstructure for pivoting the sleeve and superstructure about the support bar.

FIGURE 5 is a fragmentary horizontal cross-sectional view taken along the line 5—5 of FIGURE 1 and shows a pair of generally upstanding guide shafts constituting a portion of the superstructure and a pile protective boot slidably mounted between the upstanding shafts.

Figures 1, 3:
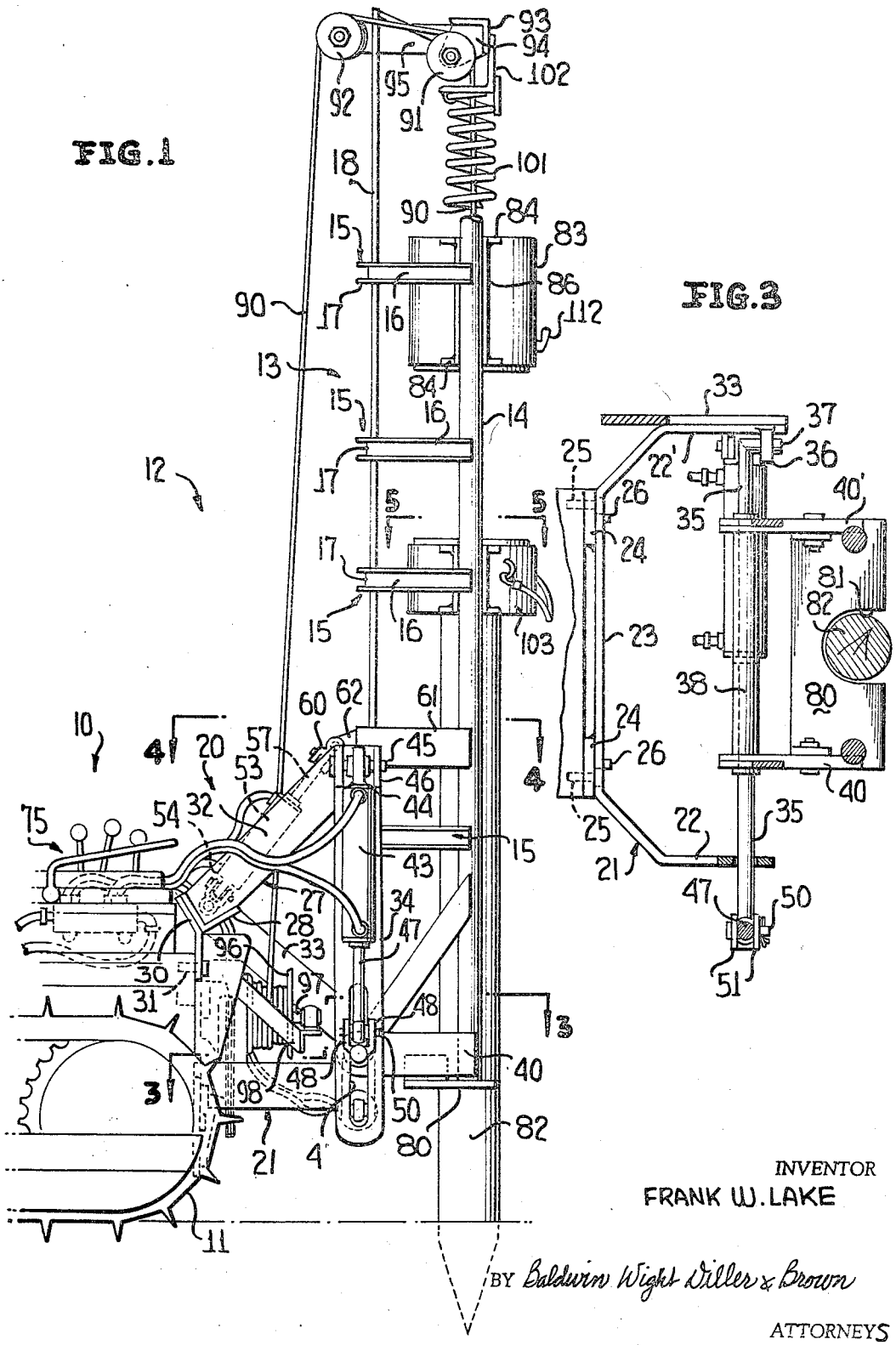
FIGURE 1 is a fragmentary side elevational view illustrating a portion of a work vehicle, a positionally variable tool support structure and an associated pile driving tool and shows the structural relationship of the vehicle and tool structure.
FIGURE 3 is a fragmentary horizontal cross sectional view taken along the line 3—3 of FIGURE 1 and shows the pivotal support rod pivotally connected to a vehicle mounted support bracket and a slidable sleeve affixed to a superstructure and slidably mounted upon the support bar.

Referring to the drawings in detail, indicated generally at 10 in FIGURE 1 is a work vehicle suitable for propelling the tool and tool support structure of this invention. While the vehicle 10 of FIGURE 1 is illustrated by the inclusion of treads 11 as being of the tread-driven variety, it will be understood that any of a number of known or suitable commercially available work vehicles may be employed in cooperation with the tool assembly described herein.

A tool structure generally indicated by the numeral 12 includes a superstructure 13 having a pair of generally vertically upstanding guide shafts 14 interconnected along the length thereof by a plurality of braces 15 which are of a generally U-shaped configuration having arms 16 fixedly connected with the shafts 14 and spanned by bight sections 17. The bight sections 17 of the braces 15 are joined by a vertically upstanding beam 18 affixed thereto and extending to the uppermost portion of the superstructure 13.

The tool structure 12 includes support provisions, generally indicated by the numeral 20, affixed to the vehicle 10 for supporting the superstructure 13. These support provisions 20 include a first lowermost bracket 21 having a pair of arms 22, 22', best illustrated in FIGURE 3, connected by a bight member or cross bar 23. The cross bar 23 is fixedly connected with the vehicle 10 via pair of plates 24 suitably fastened to the vehicle 10 in known fashion as by the provision of bolts 25 extending through the plates 24 and an available portion of the vehicle 10. The plates 24 are affixed to the bight portion or cross bar 23 and each includes a stud 26 extending outwardly from the surface thereof in contact with the lowermost portion of the cross bar 23 and providing vertical support to the cross bar.

The mounting provisions 20 include a further upper bracket 27 including a further cross bar 28 of generally L-shaped cross section and mounted upon the work vehicle 10 as by the provision of a mounting plate 30, best seen in FIGURE 1, fixedly attached to the cross bar 28 and mounted upon the vehicle 10 as indicated at 31. The bracket 27 includes a first arm portion 32 extending angularly upwardly toward the superstructure 13 from one end of the cross bar 28. At the opposite end of the cross bar 28 a second arm 33 extends angularly downwardly toward the lowermost portion of the superstructure 13.

The downwardly extending arm 33 of the upper bracket 27 meets and is affixed to the arm 22' on the corresponding side of the lower bracket 21. The angularly upwardly extending arm 32 of the upper bracket 27 is joined to one end of a bracing member 34 which etxends downwardly and is fixed adjacent its lower end to the remaining arm 22 of the lower bracket 21.

A support bar 35 is pivotally connected with the arm 22' of the lower bracket 21 as by the provision of the annular bearing member 36 welded or similarly fixedly supported upon the arm 22' and accepting an angularly disposed foot portion 37 of the bar 35 journaled therein for pivotal movement. A sleeve 38 is slidably and rotatably mounted upon the support bar 35 and extends between and is joined with a pair of plates 40, 40' which form part of the lowermost portion of the superstructure 13 and which are disposed in generally vertical planes and are affixed to the upstanding shafts 14 adjacent the lowermost portions of those shafts. It will be seen, then, that the superstructure 13 is supported by the support bar 35 through the interconnection of the sleeve 38, the plates 40 and 40', and the shafts 14, the sleeve 38 providing a slide or slide means slidable along the support bar 35 parallel to the axis thereto and rotatable, to a limited extent, about the bar 35.

The support bar 35 extends from its pivotal connection at one end with the support provisions of the tool structure through a slot 41 formed partially along the length of the bracing member 34 and is supported at its further end by a fluid actuatable, retractible and extensible piston-cylinder assembly generally indicated by the numeral 42. The assembly 42 has a cylinder 43 terminating in a mount 44 which is pivotally journaled upon a shaft 45 extending between a pair of plates 46 which form a bracket at the upper end of the bracing member 34. The assembly 42 includes a piston rod 47 terminating in an eye 48 which pivotally accepts a shaft 50 extending between a further pair of plates 51 which are affixed to the support bar 35 at the end thereof to form a further bracket. The piston-cylinder assembly 42, then, supports the bar 35 against pivotal movement until actuated as set forth hereinbelow.

Adjustment of the angular disposition of the superstructure 13 with respect to the vehicle 10 in a generally vertical plane extending in the direction of forward motion of the vehicle is effected through a piston-cylinder assembly generally indicated by the numeral 52 and including a cylinder 53 terminating in a mount 54 to which is coupled a universal coupling 55 pivotally mounted between a pair of plates 56 welded or otherwise fastened to the cross bar 28 of the upper bracket 27. The piston-cylinder assembly 52 includes a piston rod 57 terminating in an eye 58 which is connected with a further universal coupling 60. The universal coupling 60 is pivotally connected with a relatively heavy generally U-shaped brace 61 by means of a pair of plates 62 welded or otherwise secured to a bight portion 63 of the brace 61. The brace 61 constitutes a part of the superstructure 13, and like the brackets 15, is affixed to the generally upstanding guide shafts 14 at each end of the brace.

Extension and retraction of the piston rod 57 effects a pivotal movement of the superstructure 13 about the support bar 35 via a limited rotation or pivotal movement of the sleeve 38 about the axis of the bar 35. Thus, the piston-cylinder assembly 52 constitutes a first motive source for altering the position of the superstructure 13 and makes possible a variation in the angle $\theta$, best illustrated in FIGURE 6, between the longitudinal axis of the superstructure 13 and the longitudinal axis of the vehicle 10 as required by the angle of inclination $\phi$ of the vehicle 10 in its direction of forward movement.

Movement of the superstructure 13 perpendicular to its longitudinal axis is effected through the provision of a further piston-cylinder assembly 64 best illustrated in FIGURE 2. The assembly 64 includes a cylinder 65 terminating in a mount 66 supported upon a shaft 67 which in turn is supported upon the arms 22' of the lower bracket 21 as by the provision of a support plate 68. The piston-cylinder assembly 64 further includes a piston rod 70 terminating in an eye 71 fastened to the lowermost portion of the superstructure 13 and the sleeve 38 as by the provision of a shaft 72 mounted upon a downwardly extending plate 73 which, in turn, is welded or otherwise attached to the plate 40 extending between the sleeve 38 and the upstanding shaft 14.

The piston-cylinder assembly 64, located below and generally parallel to the support bar 35 constitutes a second motive source for sliding the sleeve 38 and the superstructure 13 fixedly connected with the sleeve parallel with the axis of the support bar 35.

Figure 7:
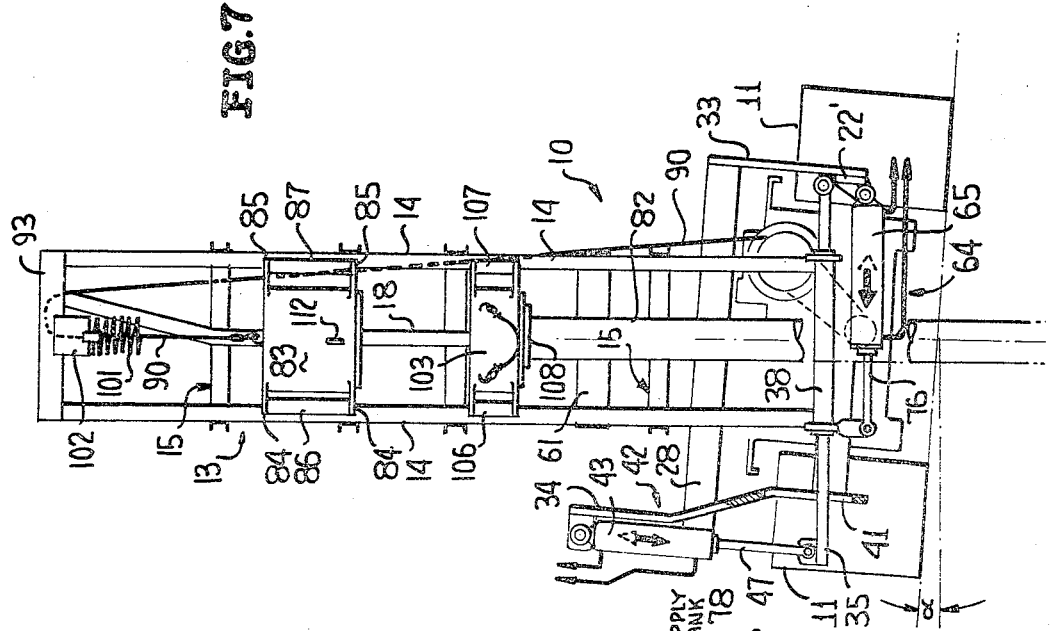
FIGURE 7 is a front elevational view of the vehicle, tool and tool support structure of FIGURE 1 with parts broken away for clarity and shows the angular relation of the superstructure and vehicle with the vehicle inclined transversely of its direction of forward movement and the superstructure extending vertically.

Compensation for a transverse angle of inclination of the vehicle 10, as best illustrated in FIGURE 7, is provided by the piston-cylinder assembly 42 which supports the bar 35 at its end opposite its pivotal connection with the support provisions of the tool structure. In addition to providing a support for the bar 35, then, the piston-cylinder assembly 42 constitutes a third motive source for tilting the superstructure 13 in a vertical plane lying perpendicular to the longitudinal axis of the vehicle 10.

Figure 6:
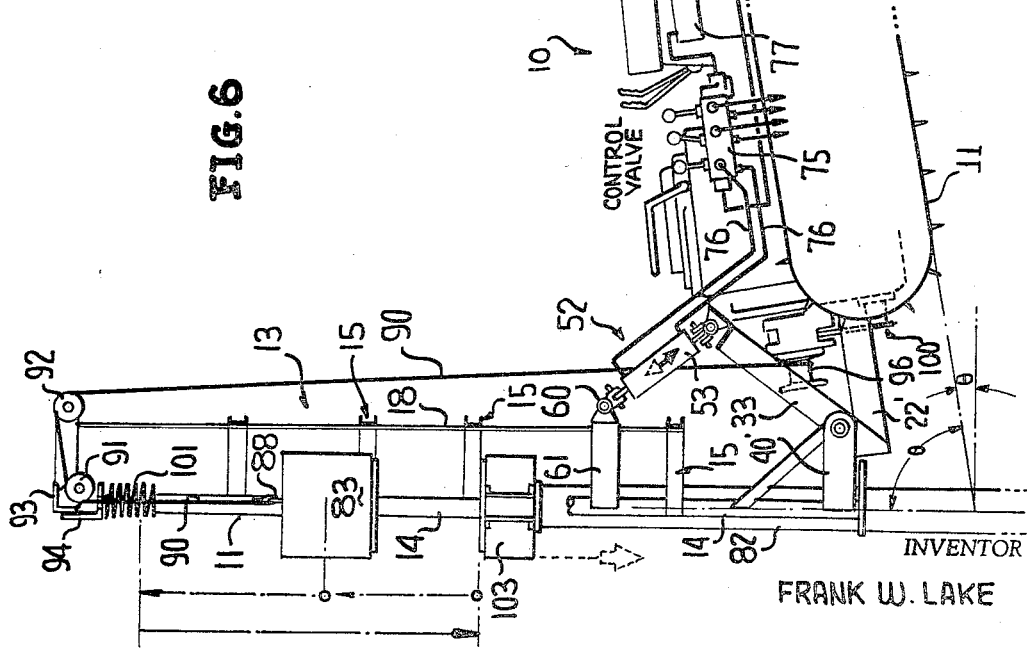
FIGURE 6 is a fragmentary side elevational view of the vehicle tool and tool support structure of FIGURE 1 with parts broken away for clarity and shows the angular relation of the superstructure and vehicle with the vehicle inclined in its direction of forward movement and the superstructure positioned vertically.

It will be seen that sleeve 38 which, in combination with the support bar 35, mounts the superstructure 13 upon its support provisions 20, provides a simple and precise arrangement for effecting tri-directional positional adjustment of the tool support structure. Actuation of the piston-cylinder assemblies 42, 52, and 64 is provided as illustrated in FIGURE 6 through the inclusion of a suitably selected manually operable valve 75 having three separately manually actuatable sections connected with each of the piston-cylinder assemblies as indicated by the fluid lines 76, 76', extending between the assembly 52 and the valve 75. A fluid supply 77 and a pump 78 are connected with the ports of the valve 75 in known fashion to supply, under pressure, fluid for extending or retracting the piston rods of each of the aforementioned piston-cylinder assemblies.

In the embodiment illustrated, the superstructure 13 is provided in cooperation with a pile driving tool and the lowermost portion of the superstructure includes, as best seen in FIGURES 3 and 4, a plate 80 secured to the lowermost ends of the generally upstanding guide shafts 14 and defining a centrally located slot 81 for aligning a pile 82 centrally with respect to the superstructure 13.

Mounted between the guide shafts 13 is a pile driving hammer 83 of generally cylindrical configuration having two pairs of generally radially outwardly extending plates 84, 84 and 85, 85. The plates of each pair of plates are spaced apart axially with respect to the hammer 83 and secure therebetween one of a pair of generally semicircular channel members 86, 87 which partially embrace the guide shafts 14 for sliding movement therealong. An eye 88 is provided upon the uppermost surface of the hammer 83 and a hammer lifting cable 90 is secured to the eye 88 and extends upwardly therefrom and is entrained over cable guidance and support provisions including first and second pulleys 91 and 92 best seen in FIGURE 1. The pulleys 91 and 92 are rotatably mounted atop the superstructure 13 by suitable mounting provisions such as the angle iron 93 extending across the upstanding shafts 14 and the support plate 94 affixed to the angle iron 93 and supporting the pulley 91. Similarly, as shown, a pulley support 95 may be provided for supporting the pulley 92 rearwardly with respect to the pulley 91 to allow entrainment of the cable 90 downwardly toward the vehicle 10 in an area removed from the superstructure 13.

Lifting of the hammer 83 is effected through actuation of a reel 96 which is rotatably supported by a shaft 97 mounted upon the vehicle 10 as by the supporting structure 98 illustrated in FIGURES 1 and 2. Rotation of the reel 96 may be effected via a drive train 100, best seen in FIGURE 2, connectible with the drive of the vehicle 10.

Disposed adjacent the uppermost limit of travel of the hammer 83 and in the path of travel thereof is a protective spring 101 affixed at its upper end to the angle iron 93 by attachment with a further angle iron 102 welded or otherwise fastened to the member 93.

Intermediate the hammer 83 and the lowermost portion of the superstructure 13, a pile protective boot or follower 103 of generally cylindrical configuration is provided for sliding movement between the guide shaft 14. Like the hammer 83, the boot 103 includes two pairs of radially outwardly extending plates 104, 104 and 105, 105. The plates of each pair are spaced axially with respect to the boot 103 and support therebetween a further pair of channel members 106, 107 of generally semicircular cross section which partially embrace the shaft 14 for sliding movement therealong. The undersurface of the boot 103 is provided with a pile receptacle 108 aligned with the channel 81 formed in the lowermost plate 80 of the superstructure 13. The receptacle 108 is positioned to receive the uppermost portion of the pile 82 to prevent swaging of the top of the pile upon release of the hammer 83 and driving contact of the hammer 83 and the boot 103.

A pair of eyes 110 are provided upon the exterior of the boot 103 and a boot support cable 111 is fastened at each end thereof to the eyes 110. A hook 112 provided upon the exterior of the hammer 83 is engageable with the boot support cable 111 and allows lifting of the boot 103 with the hammer 83 prior to and following a pile driving operation.

I claim:

1. In a tool structure for use on a self-propelled vehicle, a generally upstanding superstructure, support means for connection to said vehicle in fixed relation thereto, a support bar having an axis extending transversely of said superstructure and pivotally connected to said support means, slide means pivotally and slidably mounted on said support bar and fixedly connected to said superstructure, first motive means connected with said superstructure for pivotally moving said superstructure and slide means about the axis of said support bar, second motive means connected with said superstructure for moving said superstructure and slide means generally parallel with the axis of said support bar and third motive means connected with said support bar for pivoting said support bar about its pivotal connection with said support means to tilt said superstructure with respect to said support means.

2. Apparatus according to claim 1 wherein said slide means comprises a sleeve rotatably journaled upon said support bar and slidable thereon, said sleeve extending transversely with respect to said superstructure and affixed thereto for supporting said superstructure upon said support bar.

3. Apparatus according to claim 1 wherein each of said motive means comprises extensible and retractible fluid actuatable piston-cylinder assemblies, said apparatus further comprising manually operable valve means in fluid communication with each of said piston-cylinder assemblies for controlling extension and retraction thereof.

4. Apparatus according to claim 1 wherein said first motive means comprises a first fluid actuatable piston-cylinder assembly having one end thereof fixed with respect to said support means and connected at the further end thereof to said superstructure, said first piston-cylinder assembly extending along an axis generally transverse to the axis of said support bar for pivoting said superstructure and slide means about said support bar upon retraction and extension of said first piston-cylinder assembly, said second motive means comprising a second piston-cylinder assembly having one end thereof fixed with respect to said support means and the further end thereof connected to said superstructure, said second piston-cylinder assembly extending along an axis generally parallel to said support bar for moving said superstructure and slide means parallel to said support bar, and said third motive means comprising a third piston-cylinder assembly having one end thereof fixed with respect to said support means and the other end thereof connected with said support bar, said third piston-cylinder assembly extending along an axis lying in a generally vertical plane for pivoting said support bar in a generally vertical plane.

5. Apparatus according to claim 1 wherein said third support means is connected with said support bar at a point removed from the pivotal connection of said support bar with said connection means, means for actuating said third motive means to pivot said support bar about its pivotal connection in a generally vertical plane, said third motive means maintaining said support bar and superstructure against pivotal movement in said generally vertical plane absent actuation of said means for actuating.

6. Apparatus according to claim 1 wherein said superstructure comprises a base portion affixed to said slide means and a pair of generally upstanding guide shafts mounted upon said base portion for guiding movement of tool provisions located therebetween.

7. Apparatus according to claim 6 wherein the base portion of said superstructure comprises a pair of connecting plates each disposed in a generally vertical plane and each affixed to an opposite one of said upstanding guide shafts, said slide means comprising a sleeve extending between said plates, affixed thereto and rotatably journaled upon said support bar.

8. Apparatus according to claim 6 further comprising a pile driving hammer slidably maintained between said guide shaft, cable support means mounted adjacent the uppermost portions of said guide shaft, a hammer raising cable affixed to said hammer and entrained over cable support means for drawing said hammer upwardly and spring means adjacent the uppermost portions of said guide shafts for contacting said hammer as it approaches its uppermost limit of travel.

9. Apparatus according to claim 8 further comprising a pair of guide channels each on opposite sides of said hammer and each of said guide shafts extending through an opposite one of said guide channels for guiding sliding movement of said hammer and channels along said shafts.

10. Apparatus according to claim 9 further comprising a boot member located between said guide shafts for placement on a pile to be driven, a further pair of guide channels each on opposite sides of said boot member, each of said guide shafts extending through an opposite one of said further pair of guide channels and means for detachably connecting said boot member and hammer for movement of said boot member with said hammer.

References Cited
UNITED STATES PATENTS

| | | | |
|---|---|---|---|
| 3,172,483 | 3/1965 | Spitzer | 173—28 X |
| 3,225,842 | 12/1965 | Roeschen | 173—43 X |
| 3,384,186 | 5/1968 | Broderson et al. | 173—43 X |

ERNEST R. PURSER, Primary Examiner

U.S. Cl. X.R.

173—28, 86, 139